United States Patent [19]

Neuerburg

[11] Patent Number: 4,879,870
[45] Date of Patent: Nov. 14, 1989

[54] MOWER WITH IMPROVED STIFFENING OF THE CUTTING BAR

[75] Inventor: M. Horst Neuerburg, Saverne, France

[73] Assignee: Kuhn S.A., Saverne Cedex, France

[21] Appl. No.: 277,940

[22] Filed: Nov. 30, 1988

[30] Foreign Application Priority Data

Dec. 21, 1987 [FR] France ............................... 87 18131

[51] Int. Cl.$^4$ ...................... A01D 34/66; A01D 34/86
[52] U.S. Cl. ............................................ 56/13.6; 56/6
[58] Field of Search ...................... 56/6, 7, 15.8, 13.6, 56/296, 297, 314, DIG. 22

[56] References Cited

U.S. PATENT DOCUMENTS

| | | | |
|---|---|---|---|
| 4,117,653 | 10/1978 | Tarver, Jr. ............................ | 56/13.6 |
| 4,253,294 | 3/1981 | Zweegers ............................... | 56/13.6 |
| 4,487,003 | 12/1984 | Mathews et al. ...................... | 56/13.6 |

FOREIGN PATENT DOCUMENTS

| | | |
|---|---|---|
| 0097943 | 1/1984 | European Pat. Off. . |
| 1582356 | 4/1970 | Fed. Rep. of Germany . |
| 2380713 | 9/1978 | France . |

Primary Examiner—Jerome W. Massie, IV
Assistant Examiner—David J. Bagnell
Attorney, Agent, or Firm—Oblon, Spivak, McClelland, Maier & Neustadt

[57] ABSTRACT

A cutting bar 2 is connected to the frame 13 by at least one additional connecting element 16. On each side of the additional connecting element 16 is provided a transport element 101, 100, 29 rotating around an axis pointed upwardly. The direction of rotation of the transport elements 101, 100, 29 is such that their movements of rotation diverge toward the front. The front edge 46 of the additional connecting element 16 extends toward the rear and downwardly to the vicinity of the cutting plane 31 of the cutting elements 10 and in the operational zone of the transport elements 101, 100, 29 located on both sides of the additional connecting element 16.

19 Claims, 3 Drawing Sheets

MOWER WITH IMPROVED STIFFENING OF THE CUTTING BAR

FIELD OF THE INVENTION

This invention relates to a mower comprising a frame and a cutting bar made of one or more sections and equipped with cutting elements. The cutting bar is of a relatively slight thickness and is connected to the frame by means of connecting elements extending in the vicinity of each end of the cutting bar.

BACKGROUND OF THE INVENTION

Such mowers are now known the cutting bars of which consist of a flat beam extending crosswise to the direction of work. Disks equipped with blades that rotate around axes directed upwardly extend along the upper part of the flat beam. In addition, the flat beam contains transmission elements which drive the disks in rotation. For this purpose, the flat beam is often made in the form of a fluid-tight housing containing a lubricant for lubrication of the transmission elements.

Since the users want to cut the product to be harvested as close as possible to the ground surface, the thickness of the flat beam must be relatively slight. Concurrently, the width of cutting of the mowers has a tendency to increase. It has therefore been proven in practice that, with relatively large widths of work, the flat beam (that is, in fact, the cutting bar) was a relatively flexible unit in an approximately vertical plane extending crosswise to the direction of work. However, this flexibility may prove detrimental to the life of the cutting bar.

Efforts have therefore been made to stiffen the cutting bar by equipping the flat beam with a large stiffener located behind the beam. However, this solution has several drawbacks.

A first drawback resides in the fact that the width of the flat beam, measured in the direction of work, substantially increases so that the disks cannot sweep the whole upper surface of the beam and the stiffener while rotating. In this manner, it can happen that, under certain working conditions, accumulations of earth and/or plant debris form in places not swept by the disks. These accumulations can prove a hindrance to the smooth flow of the cut product toward the rear of the cutting bar.

A second drawback of the stiffener resides in the fact that it weighs down the cutting bar, which necessitates a lightening mechanism so that the cutting bar will not rest too heavily on the ground.

A third major drawback of the stiffener resides in the fact that, to perform its role of stiffening correctly, the stiffener must be connected as closely as possible to the flat beam. This consequently necessitates a large number of holding elements.

A fourth major drawback of the stiffener resides in the fact that it raises the cost of the cutting bar.

OBJECT OF THE INVENTION

The object of this invention is to create a correct stiffening of the cutting bar of a wide-cutting mower which does not have the drawbacks of known stiffeners, particularly the drawback of hindering the flow of the cut product.

SUMMARY OF THE INVENTION

For this purpose, the mower according to the invention is characterized by a combination of the following features:

(a) the cutting bar is connected to the frame by at least one additional connecting element extending between the two connecting elements arranged in the vicinity of the ends of the cutting bar;

(b) a transport element for the cut product rotating around an axis pointed upwardly is provided on each side of the additional connecting element, the direction of rotation of the two transport elements being such that their movements of rotation diverge toward the front, seen in the direction of work; and (c) the front edge of the additional connecting element extends toward the rear and downward to the vicinity of the cutting plane of the cutting elements and in the operational zone of the transport elements located on both sides of the additional connecting element.

Equipped with these features, the mower according to the invention responds perfectly to the established object.

The additional connecting element extending between the two connecting elements arranged in the vicinity of the ends of the cutting bar (i.e., feature (a)) substantially reduces the bending of the cutting bar under the effects of the external stresses which act on the cutting bar. Features (b) and (c) work together to prevent hooking of cut product on the additional connecting element. Moreover, since the transport elements extending on each side of the additional connecting element rotate in directions diverging toward the front in the direction of work, they remove a large part of the cut product from the additional connecting element. The remaining part of the cut product (i.e., that which has not been removed in time) comes in contact with the front edge of the additional connecting element. However, taking into account the special arrangement of this front edge, the front edge forces this part of the cut product to move downwardly in the operational zone of the transport elements which extend on both sides of the additional connecting element. Arriving in the operational zone of the transport elements, the cut product is then removed from the additional connecting element and expelled.

Advantageously, the additional connecting element extends to the center of the distance separating the rotation axes of the transport elements.

In the invention, provisions are also made for the lower end of the front edge of the additional connecting element to be, in top view, located in the vicinity of a cutting front of the cutting elements extending in the vicinity of the additional connecting element.

Likewise, provisions are also made in the invention for the upper end of the front edge to be, in top view, located clearly in front of the said cutting front.

BRIEF DESCRIPTION OF THE DRAWINGS

Other characteristics and advantages of the invention will become apparent from the following description made with reference to the accompanying drawings.

DETAILED DESCRIPTION OF THE PRESENTLY PREFERRED EMBODIMENT

A mower 1 according to the invention comprises a cutting bar 2. The cutting bar 2 is made from two cutting bar sections 3 which are joined together by a coupling element 4.

Figure 2:
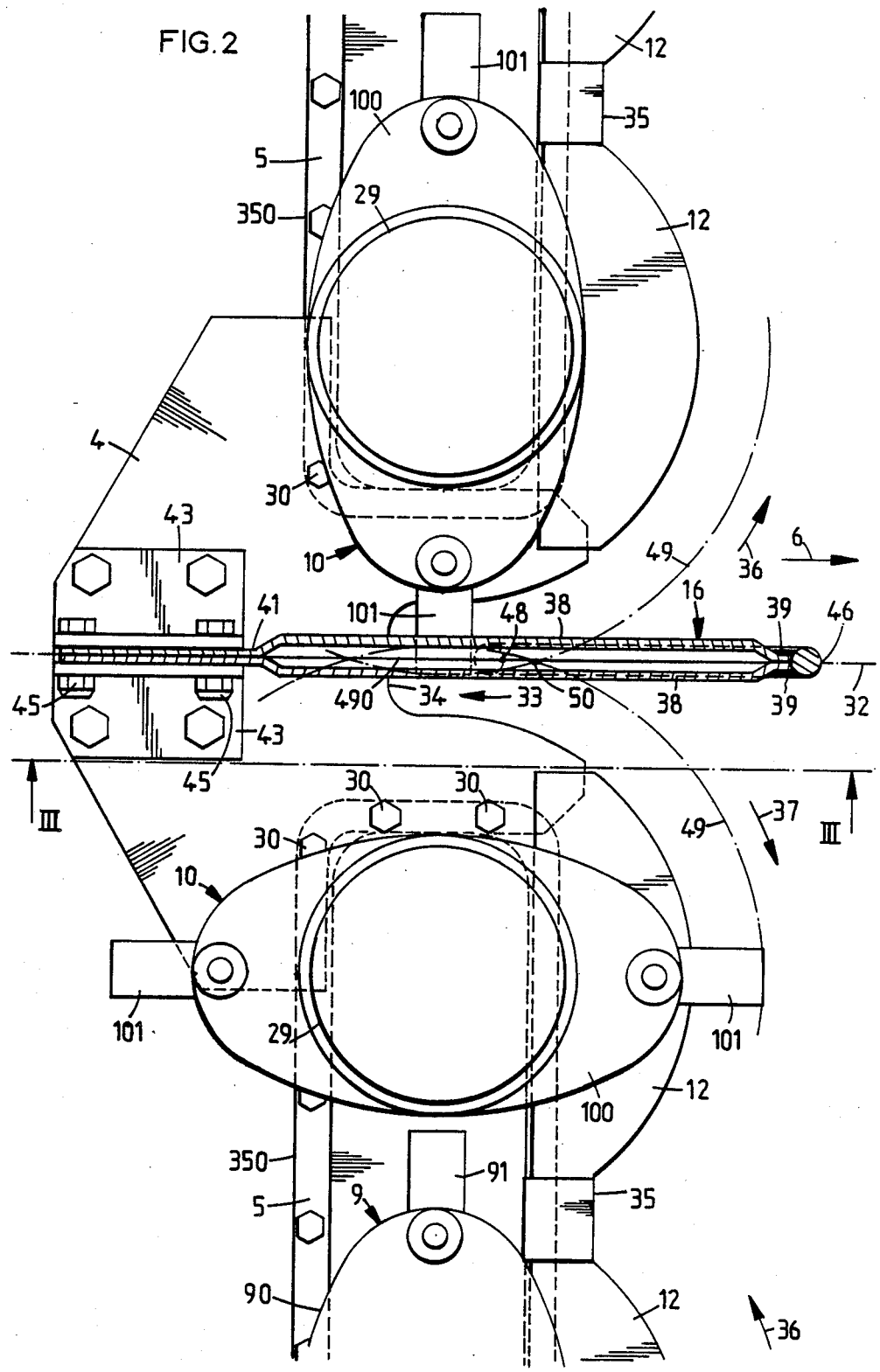
FIG. 2 is a top view on an enlarged scale of the median part of the cutting bar of the mower of FIG. 1, in a section along the plane II—II defined in FIG. 3.
Figure 3:
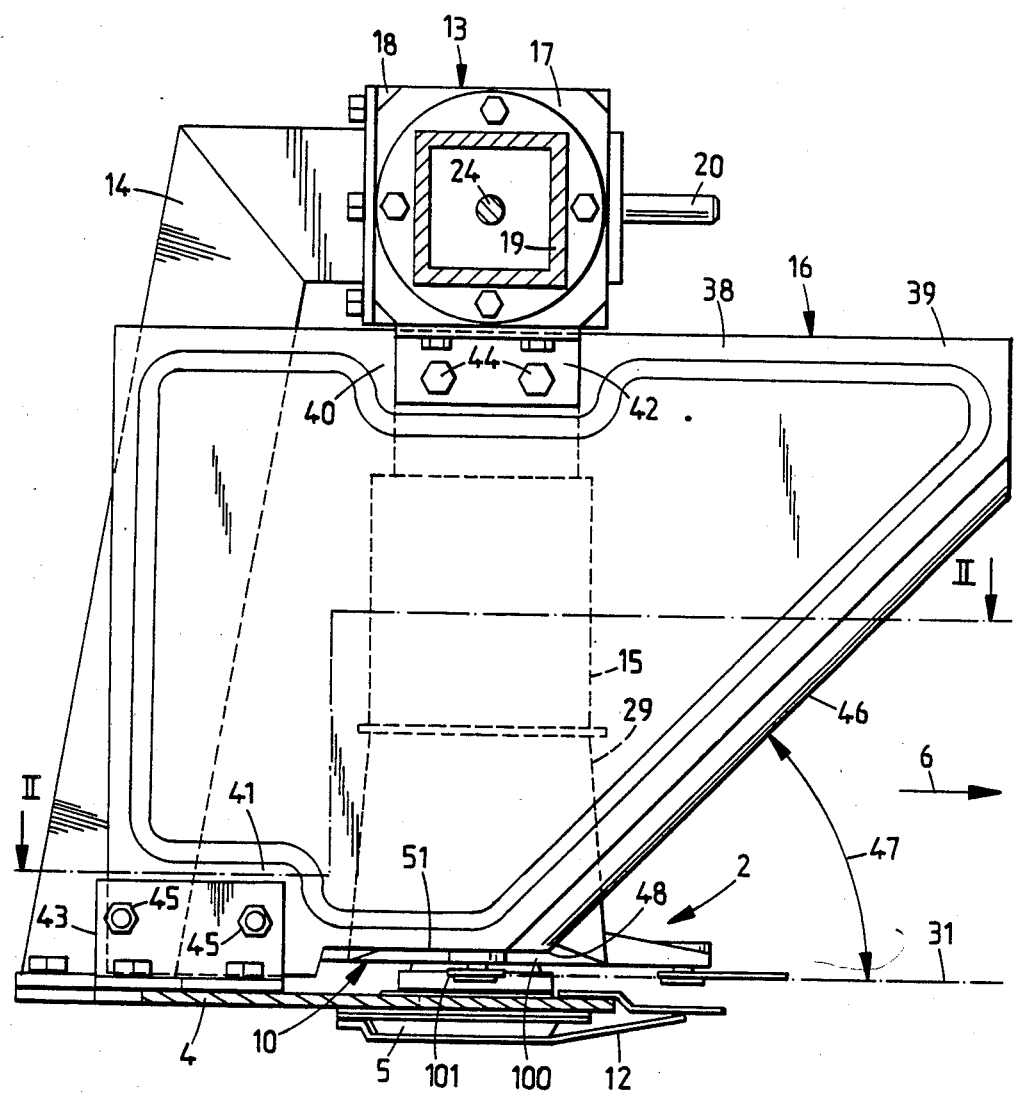
FIG. 3 is a side view on an enlarged scale of the mower of FIGS. 1 and 2 in a section along the plane III—III defined in FIGS. 1 and 2.

Each cutting bar section 3 consists of a housing 5 extending crosswise to the dirction of work 6 (see FIGS. 2 and 3). Each housing 5 supports in its upper part a certain number of rotary cutting elements 7, 8, 9, and 10 which are guided in rotation there so that each rotates around an axis pointed upwardly. Each rotary cutting element 7, 8, 9, and 10 comprises a disk 70, 80, 90, and 100 equipped with two blades 71, 81, 91, and 101. In the example illustrated, the disks 70, 80, 90, and 100 have oval shapes, and the blades 71, 81, 91, and 101 are arranged in the large axes of the ovals and are attached in an articulated manner near the outside perimeters of the corresponding disks 70, 80, 90, and 100.

During the work, the cutting bar 2 thus formed slides over the ground 11 through the use of skids 12. The skids 12 fulfill in addition a function of front protection for the rotary cutting elements 7, 8, 9, and 10.

The cutting bar 2 is connected to a frame 13 by means of two connecting elements 14 (see FIG. 3) each of which extends near a corresponding end of the cutting bar 2. Seen in the dierction of work 6, each of the connecting elements 14 extends behind the rotary cutting element 7 arranged at the corresponding end of the cutting bar 2. To prevent the cut product from being able to stay hooked on the connecting elements 14, each rotary cutting element 7 is surmounted by a windrowing drum 15 which rotates with the corresponding rotary cutting element 7. Each windrowing drum 15 functions to transport the product cut by the rotary cutting element 7 which it surmounts into the flow of product cut by the neighboring cutting elements 8 and 9. Consequently, this cut product cannot reach the zone of the connecting element 14.

According to the invention, the cutting bar 2 is also connected to the frame 13 in its median part. This connection is achieved by an additional connecting element 16 which will be described later in more detail.

The frame 13 is formed by a central housing 17, by two side housings 18, and by two brace pipes 19. Each brace pipe 19 is attached between the central housing 17 and a corresponding side housing 18. In FIG. 3, it is seen, moreover, that each connecting element 14 is connected to the corresponding side housing 18, which extends above the corresponding end of the cutting bar 2.

Figure 1:
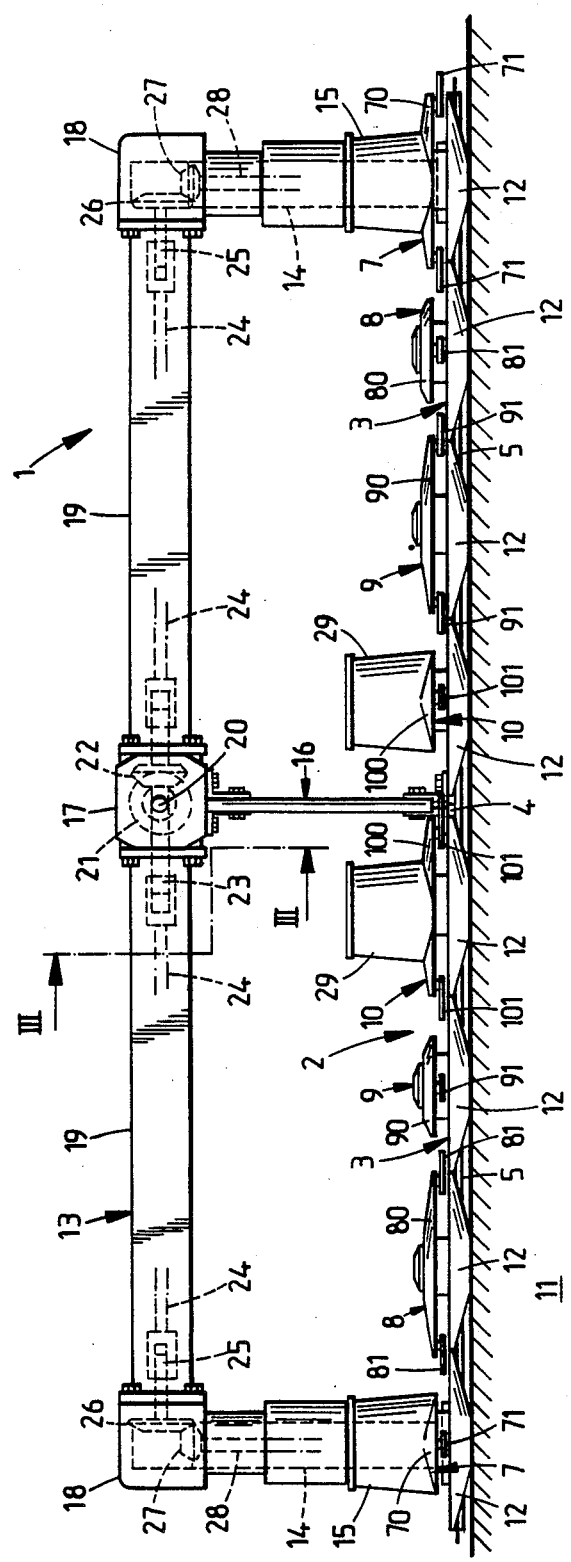
FIG. 1 is a front view of a mower according to the invention.

As can be seen in FIG. 1, the frame 13 also supports drive elements for the rotary cutting elements 7, 8, 9, and 10 and the windrowing drums 15. These drive elements first of all comprise an input shaft 20 pointed at least approximately in the direction of work 6. The input shaft 20 is connected in rotation to a bevel gear 21. The bevel gear 21 meshes with a bevel gear 22 connected in rotation to an output shaft 23 having two ends each of which penetrates in a corresponding one of the brace pipes 19. At each of its ends, the output shaft 23 is joined to an end of a corresponding transmission shaft 24 which extends inside the corresponding brace pipe 19.

Each transmission shaft 24 is joined at its other end to an input shaft 25 received in the corresponding side housing 18. Inside each side housing 18 each input shaft 25 is connected in rotation to a bevel gear 26 which meshes with a bevel gear 27 connected in rotation to the upper end of a drive shaft 28. Each drive shaft 28 is colinear with the axis of rotation of the corresponding rotary cutting element 7 and the corresponding windrowing drum 15. Each drive shaft 28 drives in rotation the corresponding cutting element 7 and the corresponding windrowing drum 15, as well as transmission elements housed in the housing 5 of the corresponding cutting bar section 3. These transmission elements, not represented but known to persons of the art, serve to drive in rotation the rotary cutting elements 8, 9, and 10 of each cutting bar section 3.

In FIG. 1, it is also seen that the rotary cutting elements 10, located on each side of the additional connecting element 16, are each surmounted by a transport drum 29 for the cut product. Each transport drum 29 is connected in rotation to the rotary cutting element 10 which it surmounts, and each transport drum 29 rotates around the same axis of rotation as the corresponding rotary cutting element 10. The transmission elements housed inside the housing 5 of each cutting bar section 3 therefore also drive the corresponding transport drum 29.

In the figures, representations were intentionally omitted of a number of elements—such as, for example, a hitching device allowing for the hitching of the mower according to the invention to a tractor. Such hitching devices are within the scope of persons of the art. Nor is the driving source which drives the input shaft 20 from the central housing 17 represented, because this is also within the scope of a person of the art.

In FIG. 2, the median part of the cutting bar 2 formed by the two cutting bar sections 3 joined together by the coupling element 4 is seen. The coupling element 4 is made in the form of a plate and is connected to the housing 5 of each cutting bar section 3 by means of bolts 30. As can be seen in FIG. 3, the coupling element 4 also extends below the cutting plane 31 of the rotary cutting element 10 arranged at the adjacent ends of the cutting bar sections 3. In front, the coupling element 4 comprises, centered on the plane of symmetry 32 of the cutting bar 2, a cutout 33 having, in top view, an approximately U-shape. In this way, the front edge 34 of the coupling element 4 is set far back in relation to the front edge 35 of the cutting bar sections 3. Accordingly, accumulations of earth and/or plant debris, which can form in this place, are prevented from growing to such a point that they would hinder good mowing of the product to be cut which is present at this spot.

In FIGS. 2 and 3, the additional connecting element 16 is also seen in detail. The additional connecting element 16 extends in the plane of symmetry 32 pointed in the direction of work 6. The additional connecting element 16 therefore extends symmetrically between the two rotary cutting elements 10, each of which is surmounted by one of the transport drums 29. Seen in the direction of work 6, the rotary cutting element 10 located to the left of the additional connecting element 16 as well as the corresponding transport drum 29 rotate in the counterclockwise direction 36, and the rotary cutting element 10 located to the right of the additional connecting element 16, as well as the corresponding transport drum 29, rotate in the clockwise direction 37. Thus, the movements of rotation of the cutting elements 10 and of the corresponding transport drums 29 located on the two sides of the additional connecting element 16 diverge at the front of the cutting bar 2.

In the example illustrated, the additional connecting element 16 is formed by two plates 38. The two plates 38 are stamped on practically their entire surface. Only the outside perimeter 39 of each plate 38 has not been stamped. The two plates 38 are assembled with one another by their outside perimeters 39, which touch one another, while the stamped parts are separated from one another. With this arrangement, the additional connecting element 16 possesses a good stiffness, yet it does not have either a great thickness or an excessive weight.

In the upper median part and in the lower rear part, the outside perimeters 39 of the plates 38 exhibit an unstamped surface 40 and 41, larger than otherwise. In these two places, the additional connecting element 16 is connected to the central housing 17 of the frame 13 and to the coupling element 4 of the cutting bar 2. This connection is achieved in a very simple manner by two brackets 42 attached to the central housing 17 and by two brackets 43 attached to the coupling element 4, between which are wedged the two plates 38 with the help of bolts 44 and 45. It will also be noted that the brackets 43 extend approximately behind the rear edge 350 of the cutting bar sections 3.

The front edge 46 of the additional connecting element 16 is, over a large part of its length, inclined toward the rear and downward at an angle 47 which has, in the example illustrated, a value of at least approximately 45°. The front edge 46 extends up to a short distance above the cutting plane 31. In addition, the lower end 48 is, in top view, located inside the common surface 490 delimited by the extreme intersecting paths 49 described by the rotary cutting elements 10. In the invention, the lower end 48 can also be slightly extended in front of the forward intersection point 50 of the extreme intersecting paths 49. In the lower part, the additional connecting element 16 comprises a lower edge 51 extending toward the rear from the lower end 48 of the front edge 46 at least approximately parallel to the cutting plane 31.

In FIG. 2, it is seen that the front edge 46 of the additional cutting element 16 is preferably formed by a shape with round cross section.

The mower according to the invention which has just been described operates in the following manner.

At work, the mower is moved in the direction of work 6 by a tractor, not shown. A driving source (such as the power takeoff of the tractor, for example) drives in rotation the rotary cutting elements 7, 8, 9, and 10 as well as the windrowing drums 15 and the transport drums 29.

The cutting bar 2, which slides on the ground 11, is subject to stresses that deform it. This deformation, however, is substantially limited by the additional connecting element 16.

The additional connecting element 16 has a special shape which works with the transport elements located on both sides of the additional connecting element 16 to prevent the product cut by the blades 101 of the rotary cutting element 10 from staying hooked to the additional connecting element 16. In the example illustrated, the above-mentioned transport elements consist of the blades 101 (which, besides their cutting function, also have a transport function), the disks 100, and the transport drums 29.

At work, a large part of the product cut by the blades 101 of the rotary cutting elements 10 is removed from the additional connecting element 16 by the blades 101, the disks 100, and the transport drums 29. The remaining part of the product cut by the blades 101 (i.e., the part which has not been removed) comes in contact with the front edge 46. Considering its inclination toward the rear and downwardly, the front edge 46 forces the cut product to move downward toward the operational zone of the blades 101 and especially of the disks 100. This cut product is then grabbed by the blades 101 and the disks 100 to be removed from the additional connecting element 16 and deposited behind the cutting bar 2. Considering the rounded shape of the front edge 46 of the additional connecting element 16, the blades of the cut product, are prevented from being bent. The blades of the cut product can therefore better slide toward the operational zone of the transport elements.

Various modifications or improvements can be made to the embodiment which has just been described without going outside the scope of the invention. In particular, the mower 1 can in addition comprise elements for treating the product cut by the rotary cutting elements 7, 8, 9, and 10 of the cutting bar 2.

What is claimed as new and desired to be secured by Letters Patent of the United States is:

1. A mower comprising:
   (a) a frame; and
   (b) a cutting bar made of one or more sections and comprising cutting elements mounted on it, said cutting bar having two ends,
wherein:
   (c) said cutting bar is of a relatively slight thickness;
   (d) said cutting bar is connected to said frame by means of a first connecting element extending in the vicinity of each one of said two ends of said cutting bar;
   (e) said cutting bar is connected to said frame by at least one second connecting element extending between said two first connecting elements, said second connecting element having a front edge;
   (f) on each side of said second connecting element is provided a transport element rotating around an axis pointed upwardly, the direction of rotation of said two transport elements being such that their movements of rotation diverge toward the front, seen in the direction of work; and
   (g) the front edge of said second connecting element extends toward the rear and downwardly to the vicinity of a cutting plane of said cutting elements and in an operational zone of said two transport elements.

2. A mower according to claim 1 wherein said second connecting element extends to the middle of a distance separating the axes of rotation of said transport elements.

3. A mower according to claim 1 wherein said second connecting element extends in a plane of symmetry of said cutting bar.

4. A mower according to claim 1 wherein a lower end of the front edge of said second connecting element is, in top view, located in the vicinity of a cutting front of said cutting elements extending in the vicinity of said second connecting element.

5. A mower according to claim 1 wherein an upper end of the front edge of said second connecting element is, in top view, located clearly in front of a cutting front of said cutting elements extending in the vicinity of said second connecting element.

6. A mower according to claim 1 wherein the front edge of said second connecting element makes an angle of at least approximately 45° with the cutting plane of said cutting elements extending in the vicinity of said second connecting element.

7. A mower according to claim 1 wherein:
(a) a lower end of the front edge of said second connecting element extends to a lower edge of said second connecting element and
(b) said lower edge of said second connecting element extends toward the rear at least approximately parallel to the cutting plane of said cutting elements extending in the vicinity of said second connecting element.

8. A mower according to claim 1 wherein at least a front part of said second connecting element is, looked at in a direction crosswise to the direction of work, relatively thin.

9. A mower according to claim 8 wherein the front edge of said second connecting element is rounded.

10. A mower according to claim 9 wherein the front edge of said second connecting element comprises a shape with round cross section.

11. A mower according to claim 1 wherein:
(a) said second connecting element is formed by two plates stamped on practically their entire surface except along their outside perimeters;
(b) said two plates are assembled with one another by their outside perimeters, which touch one another; and
(c) the stamped parts of said two plates are separated from one another.

12. A mower according to claim 11 wherein the front edge of said second connecting element comprises a shape with round cross section.

13. A mower according to claim 1 wherein said second connecting element is connected to said cutting bar at least approximately behind a rear edge of said cutting bar.

14. A mower according to claim 1 wherein:
(a) said cutting bar is formed by two cutting bar sections connected together by means of a coupling element and
(b) said second connecting element is connected to said coupling element.

15. A mower according to claim 1 wherein at least said cutting elements located adjacent to said second connecting element are rotary cutting elements and have intersecting paths.

16. A mower according to claim 15 wherein said rotary cutting elements located adjacent to said second connecting element rotate around the same axis of rotation as the corresponding transport element.

17. A mower according to claim 15 wherein said rotary cutting elements located adjacent to said second connecting element rotate in the same direction of rotation as the corresponding transport element.

18. A mower according to claim 15 wherein a lower end of the front edge of said second connecting element extends, in top view, either to the inside of a common surface delimited by the paths of said rotary cutting elements or slightly in front of a forward intersection point of the paths of said rotary cutting elements.

19. A mower according to claim 1 wherein each of said transport elements comprises a transport drum.

* * * * *